United States Patent
Shi et al.

(10) Patent No.: US 11,705,815 B1
(45) Date of Patent: Jul. 18, 2023

(54) HOLDUP TIME EXTENSION FOR LLC CIRCUIT

(71) Applicant: AES Global Holdings PTE Ltd., Singapore (SG)

(72) Inventors: Lei Shi, Kowloon (HK); Kandor Sze Ngok Pong, Kowloon (HK); Siu Lun Wu, Kowloon (HK)

(73) Assignee: AES Global Holdings PTE Ltd., Singapore (SG)

( * ) Notice: Subject to any disclaimer, the term of this patent is extended or adjusted under 35 U.S.C. 154(b) by 0 days.

(21) Appl. No.: 17/651,951

(22) Filed: Feb. 22, 2022

(51) Int. Cl.
  *H02M 3/335* (2006.01)
  *H02M 1/00* (2006.01)
  *H02M 3/00* (2006.01)

(52) U.S. Cl.
  CPC ..... *H02M 3/33571* (2021.05); *H02M 1/0096* (2021.05); *H02M 3/01* (2021.05); *H02M 3/33573* (2021.05); *H02M 3/33592* (2013.01)

(58) Field of Classification Search
  CPC .............. H02M 3/01; H02M 3/33571; H02M 3/33573; H02M 3/33592; H02M 1/0096
  See application file for complete search history.

(56) References Cited

U.S. PATENT DOCUMENTS

| 9,143,040 | B2 | 9/2015 | Lee | |
| 11,588,398 | B1* | 2/2023 | Huang | H02M 3/33592 |
| 2015/0229225 | A1* | 8/2015 | Jang | H02M 3/285 363/17 |
| 2016/0105120 | A1* | 4/2016 | Hirano | H02M 3/33584 363/17 |
| 2018/0248489 | A1* | 8/2018 | Wang | H02M 7/217 |
| 2020/0304033 | A1* | 9/2020 | Escudero Rodriguez | H02M 3/33523 |
| 2021/0359613 | A1* | 11/2021 | Leirens | H02M 1/4233 |

* cited by examiner

*Primary Examiner* — Jue Zhang

(57) ABSTRACT

A controller of a power converter is coupled to a switch assembly and configured to perform a hold-up time procedure that causes the controller to control first and second switching elements into opposite conducting states during a first period of time of a pulse cycle and into alternate opposite conducting states during a second period of time of the pulse cycle. The hold-up time procedure also causes the controller to control a first pair of synchronous rectifier switching devices into a conducting state during a third period of time overlapping less than all of the first period of time and into the conducting state during a fourth period of time overlapping less than all of the second period of time. A second pair of synchronous rectifier switching devices is controlled into a non-conducting state during the first and second periods of time.

20 Claims, 7 Drawing Sheets

HOLDUP TIME EXTENSION FOR LLC CIRCUIT

TECHNICAL FIELD

Embodiments of the present disclosure relate to power supplies and, more particularly, to increasing a hold-up time in resonant LLC power converters.

BACKGROUND

Resonant LLC converter topology is widely used due to its zero-voltage-switching (ZVS) capability, low-voltage stress, high efficiency performance, and its ability to achieve high power density. However, there is a trade-off between the high efficiency and long hold-up time performance in a resonant converter.

Generally, the hold-up time of a converter is the amount of time (typically in milliseconds) that a power converter can continue to generate output within a specified range after an input power interruption. Efficiency can be increased significantly with, for example, an increase in magnetizing inductance to reduce switching losses. However, the hold-up time will consequently decrease by a significant amount as well. Alternatively, efficiency may be sacrificed for long hold-up time performance. For example, to get a longer hold up time, a lower ratio (Lm/Lr) may be designed. However, this action will lower efficiency. One solution for maintaining high efficiency performance while achieving long hold-up time includes increasing the bulk capacitance. However, this results in lower power density and also includes a higher cost.

OVERVIEW

In accordance with one aspect of the present disclosure, a power converter comprises a first voltage input comprising a first input terminal and a second input terminal configured to receive an input voltage, a first switching element and a second switching element coupled in series across the first voltage input, and a transformer comprising a first winding coupled with the first and second switching elements. Each of the first and second switching elements has a conducting state and a non-conducting state. An output circuit comprises a voltage output, a second winding of the transformer inductively coupleable to the first winding, and a synchronous rectifier assembly coupled between the voltage output and the second winding and comprising a plurality of switching devices coupled together in a full-bridge arrangement and configured to supply an output voltage to the voltage output in response to a current flowing through the second winding. A controller is coupled to the switch assembly and configured to perform a hold-up time procedure. The hold-up time procedure is configured to cause the controller to control the first switching element into the conducting state while controlling the second switching element into the non-conducting state during a first period of time of each pulse cycle of a plurality of pulse cycles and to control the second switching element into the conducting state while controlling the first switching element into the non-conducting state during a second period of time of each pulse cycle of the plurality of pulse cycles. The hold-up time procedure is also configured to control a first pair of synchronous rectifier switching devices of the synchronous rectifier assembly into a conducting state during a third period of time overlapping less than all of the first period of time and into the conducting state during a fourth period of time overlapping less than all of the second period of time and to control a second pair of synchronous rectifier switching devices of the synchronous rectifier assembly into a non-conducting state during the first and second periods of time.

In accordance with another aspect of the present disclosure, a method for controlling a secondary side synchronous rectifier assembly of a power converter during a hold-up time, the power converter further comprising a voltage input, a plurality of primary side switching elements coupled to the voltage input, a resonant circuit coupled to the plurality of primary side switching elements, and an output circuit having a voltage output, wherein the resonant circuit has a first transformer winding, wherein the output circuit has a second transformer winding coupled to the secondary side synchronous rectifier assembly and to the voltage output. The method comprises controlling a first switching element of the plurality of primary side switching elements into a conducting state while controlling a second switching element of the plurality of primary side switching elements into a non-conducting state throughout a first segment of each pulse cycle of a plurality of pulse cycles and includes controlling the second switching element into a conducting state while controlling the first switching element into a non-conducting state throughout a second segment of each pulse cycle of the plurality of pulse cycles. The method also includes controlling first and second rectifier switches of the secondary side synchronous rectifier assembly into conducting states overlapping a portion of the first segment of each pulse cycle and into conducting states overlapping a portion of the second segment of each pulse cycle and includes controlling third and fourth rectifier switches of the secondary side synchronous rectifier assembly into non-conducting states throughout each pulse cycle.

BRIEF DESCRIPTION OF THE DRAWINGS

The drawings illustrate embodiments presently contemplated for carrying out the invention.

In the drawings.

Figure 1:
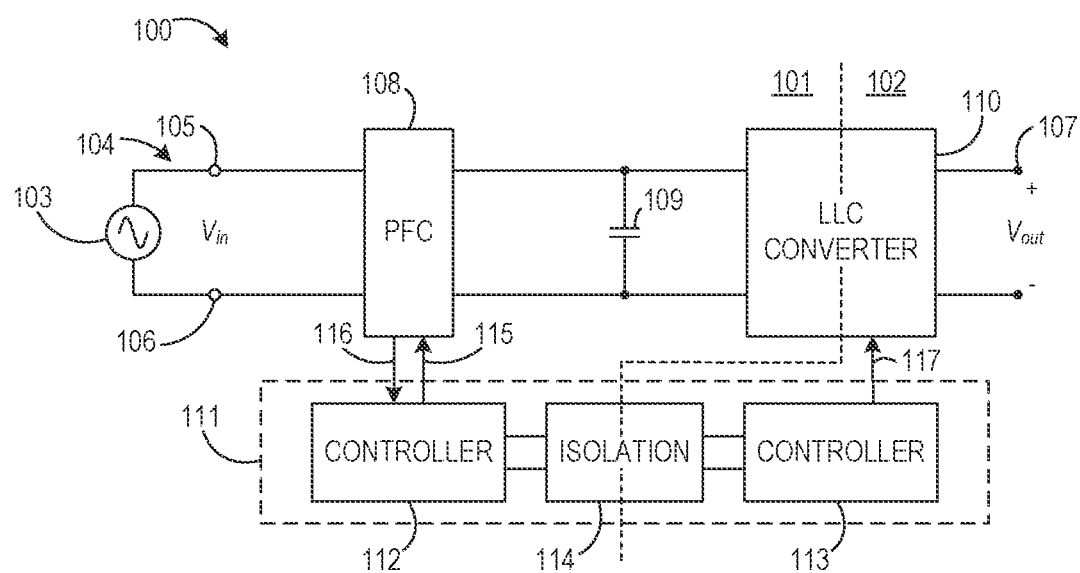
FIG. 1 is a circuit block diagram illustrating a power converter according to an example.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

FIG. 1 illustrates a circuit block diagram of a power converter 100 having a primary side 101 and a secondary side 102. The power converter 100 receives a voltage such as an AC voltage from a voltage source 103 via a voltage input 104 having input terminals 105, 106 and converts the received voltage to a DC voltage for supply to a load via a voltage output 107. An AC-DC converter such as a power factor correction PFC converter 108 converts the input AC voltage to a DC voltage that is output to a bulk capacitor 109 and to a DC-DC converter implemented according to aspects disclosed herein as an LLC converter 110. In an example, the PFC converter 108 includes a bridged or a bridgeless PFC circuit (not shown) that boosts the input AC voltage to a higher voltage and supplies the boosted DC voltage to the bulk capacitor 109 and to the LLC converter 110.

The power converter 100 also includes a control circuit 111 for controlling one or more power switches (not shown) in the power converters 108, 110. As shown in FIG. 1, the control circuit 111 includes a primary side controller 112, a secondary side controller 113, and an isolation component 114 coupled between the primary side controller 112 and the secondary side controller 113. The isolation component 114 may include, for example, an optocoupler, a transformer, etc.

The primary side controller 112 controls one or more power switches in the AC-DC power converter 108. For example, the primary side controller 112 may generate one or more control signals 115 for controlling the power switches of the AC-DC power converter 108 for correcting a power factor. The control signals 115 may be generated based on a sensed parameter 116 (e.g., an AC input current, an AC input voltage and/or a DC bulk voltage) of the AC-DC power converter 108, the power converter 100, etc. As shown in FIG. 1, the secondary side controller 113 controls switches (FIG. 2) in the resonant LLC power converter 110. For example, the secondary side controller 113 may generate one or more control signals 117 for controlling one or more power switches (e.g., metal-oxide-semiconductor field-effect transistors (MOSFETs)) and/or one or more synchronous rectifiers (e.g., MOSFETs).

Figure 2:
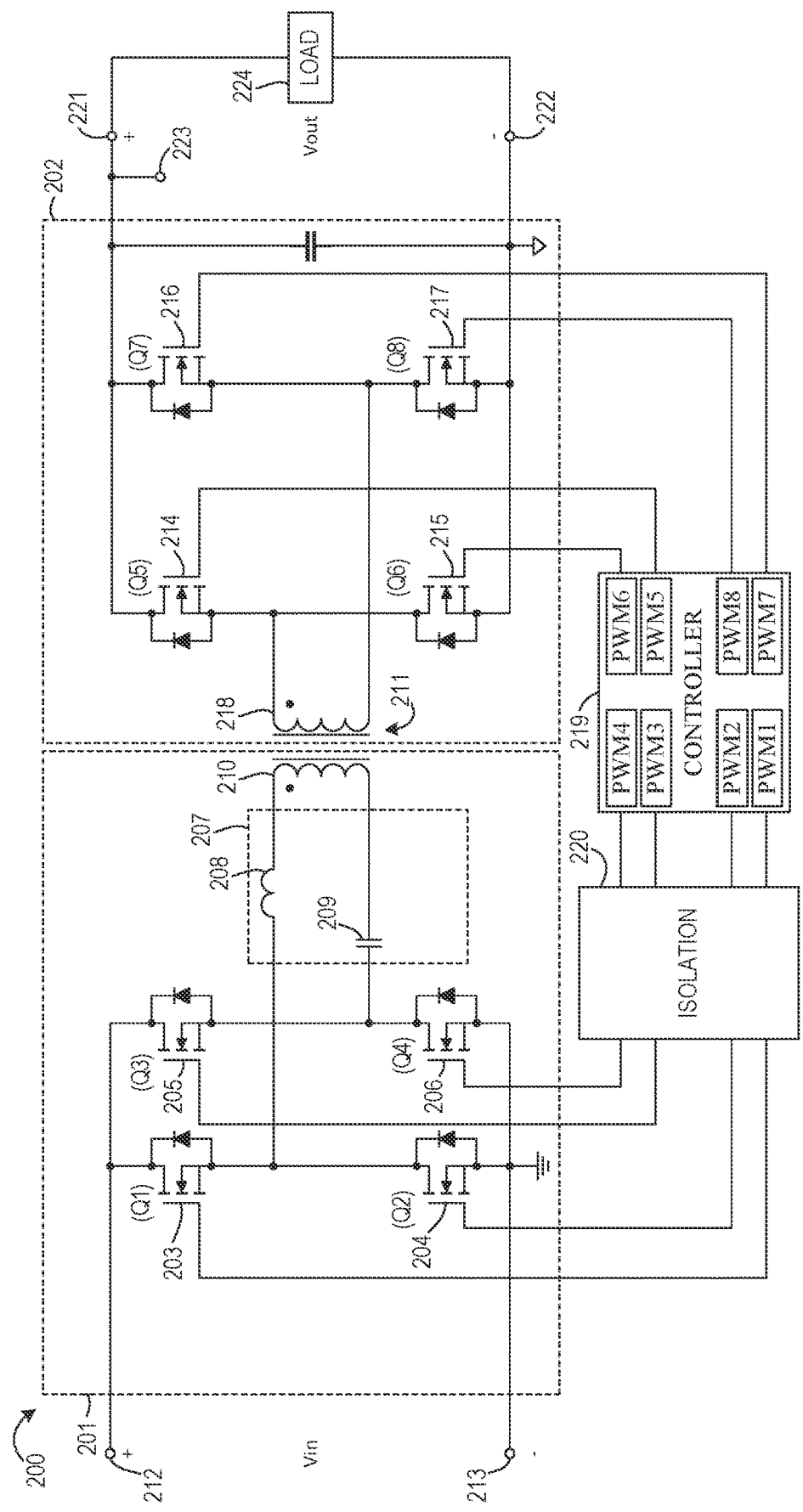
FIG. 2 illustrates a resonant full-bridge LLC converter according to an example.

FIG. 2 illustrates an LLC converter 200 circuit according to an embodiment of the present disclosure. The LLC converter 200 has a primary side 201 and a secondary side 202. The primary side 201 is illustrated as a full-bridge arrangement or configuration in FIG. 2 including four switches 203-206 (Q1-Q4) and a resonant network 207 including a resonant inductor 208, a resonant capacitor 209, and a primary winding 210 of a transformer 211. An input voltage, $V_{in}$, is received at input terminals 212, 213 coupled to the switches 203-206. The input terminals 212, 213 are coupled, for example, to the bulk capacitor 109 and the PFC converter 108 of FIG. 1.

The LLC converter 200 depicted in FIG. 2 utilizes synchronous rectification and, accordingly, includes switches or transistors 214-217 (Q5-Q8) in the secondary side 202 arranged in a full-bridge configuration or arrangement and coupled to a secondary winding 218 of the transformer 211. The transistors 214, 216 alternately operate as a high side switches for the secondary side 202, and the transistors 215, 217 alternately operate as a low side switches for the secondary side 202. A controller 219 includes the hardware and logic used to drive switches 203-206 and 214-217 and implement a hold-up time extension algorithm described herein by manipulating the turn-on times or conduction modes of the secondary side switches 214-217 in relation to their corresponding first side switches 203-206. One or more isolation components 220 (e.g., an optocoupler) is used to communicate gate turn-on signals PWM1-PWM4 to the first side switches 203-206 as illustrated to provide isolation between the primary side 201 and the secondary side 202. The secondary side switches 214-217 are controlled via gate turn-on signals PWM5-PWM8 and provide an output voltage, $V_{out}$, on output terminals 221, 222.

A number of measurement sensors are illustrated for use in determining switching frequency according to embodiments. An output voltage sensor 223 is configured to measure the output voltage, $V_{out}$, of the LLC converter 200. The controller 219 is configured to measure the output voltage as part of the control scheme for controlling the LLC converter 200 for producing the desired output voltage, $V_{out}$, supplied to a load 224.

Figure 3:
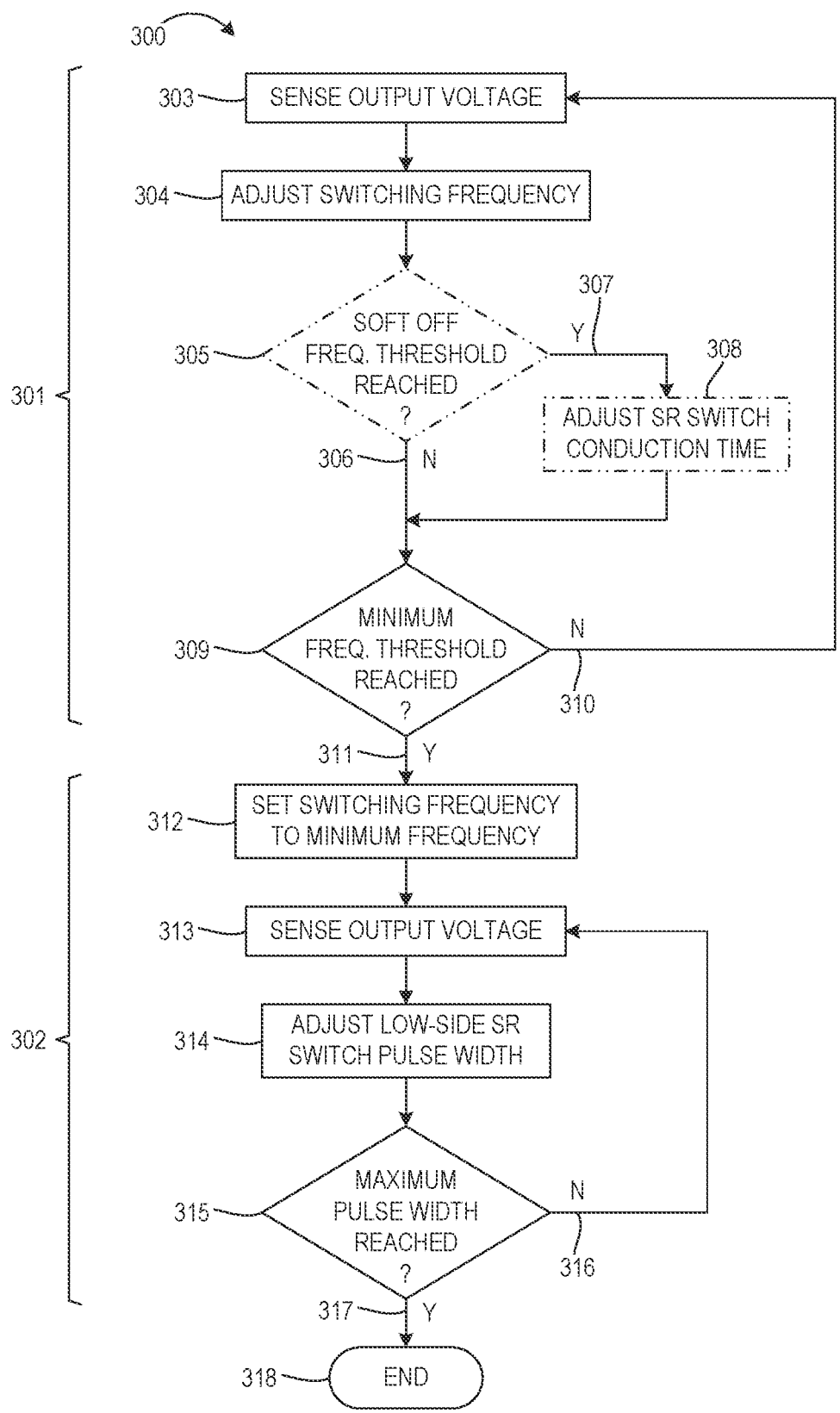
FIG. 3 illustrates a flowchart of a voltage converter procedure including hold-up time extension according to an example.

FIG. 3 is a flowchart illustrating a voltage converter control operation 300 executable by the controller 219 of FIG. 2 for controlling the LLC converter 200 according to an example. The control operation 300 includes a switching frequency adjustment control portion 301 and a hold-up time extension control portion 302. Referring to FIGS. 2 and 3, the control operation 300 begins with sensing (step 303) an output voltage at the terminals 221, 222 via, for example, the output voltage sensor 223. Based on the sensed voltage level, a switching frequency of the pulse-width modulated control signals PWM1-PWM8 is adjusted (step 304) to achieve the desired output voltage. In one example, a nominal input voltage, $V_{in}$, provided via the bulk capacitor 109 may be 400 V while the desired output voltage, $V_{out}$, may be 48 V. The switching frequency in this example may be at or near 350 kHz to produce the desired 48 V output voltage when provided with the 400 V input voltage. In response to a higher input voltage, the switching frequency may be increased while a lower input voltage may cause a decrease in the switching frequency. In other examples, the respective input and output voltages as well as the corresponding switching frequencies may be different based on circuit characteristics and other parameters.

At step 305 (shown in phantom), a soft off pulse control optionally includes comparing the adjusted switching frequency with a soft off frequency threshold to determine whether the soft off frequency threshold has been reached. While the switching frequency remains above the soft off frequency threshold (step 306), the pulses of the PWM signals controlling the secondary side switches 214-217 are left at their full calculated conduction times. However, if the soft off frequency threshold has been reached (step 307), the pulses of the PWM signals controlling the secondary side switches 214-217 may be optionally adjusted (step 308) to reduce their conduction times. By adjusting the conduction times while leaving the rise times at their calculated positions, the duty cycles of the PWM signals decrease. As described below, during the hold-up time extension control portion 302 of the control operation 300, the secondary high-side switches 214, 216 are constantly controlled into their off or non-conducting modes or states. To increase performance of the LLC converter 200 in the transition from the switching frequency adjustment control portion 301 to the hold-up time extension control portion 302, the soft off pulse control operates to adjust the falling edges of the PWM signals closer to their respective rising edges as the adjusted switching frequency approaches the transition. Accordingly, the conduction times and, correspondingly, the duty cycles of the PWM signals PWM5-PWM8 are reduced toward zero as a difference between the adjusted switching frequency and a minimum frequency threshold for the frequency adjustment control portion 301 approaches zero. As indicated, using the soft off pulse control is optional and may be utilized or not utilized without deviating from the scope of the embodiments described herein.

At step 309, the adjusted switching frequency is compared with the minimum frequency threshold to determine whether the minimum frequency threshold has been reached. While the minimum frequency threshold has not been reached (step 310), process control returns to step 303 for a subsequent iteration of steps 303-309.

In an example, a nominal switching frequency of 130 kHz set to produce a desired output voltage may include a minimum switching frequency of 75 kHz and a soft off frequency threshold of 95 kHz. As the switching frequency is decreased in response to a decreasing input voltage, a crossing of the 95 kHz soft off frequency threshold causes the control operation 300 to reduce the conduction time of the PWM signal pulses as described above until the 75 kHz minimum switching frequency is reached. Accordingly, the switching of the secondary side switches 214-217 is softly controlled off.

Figure 4:
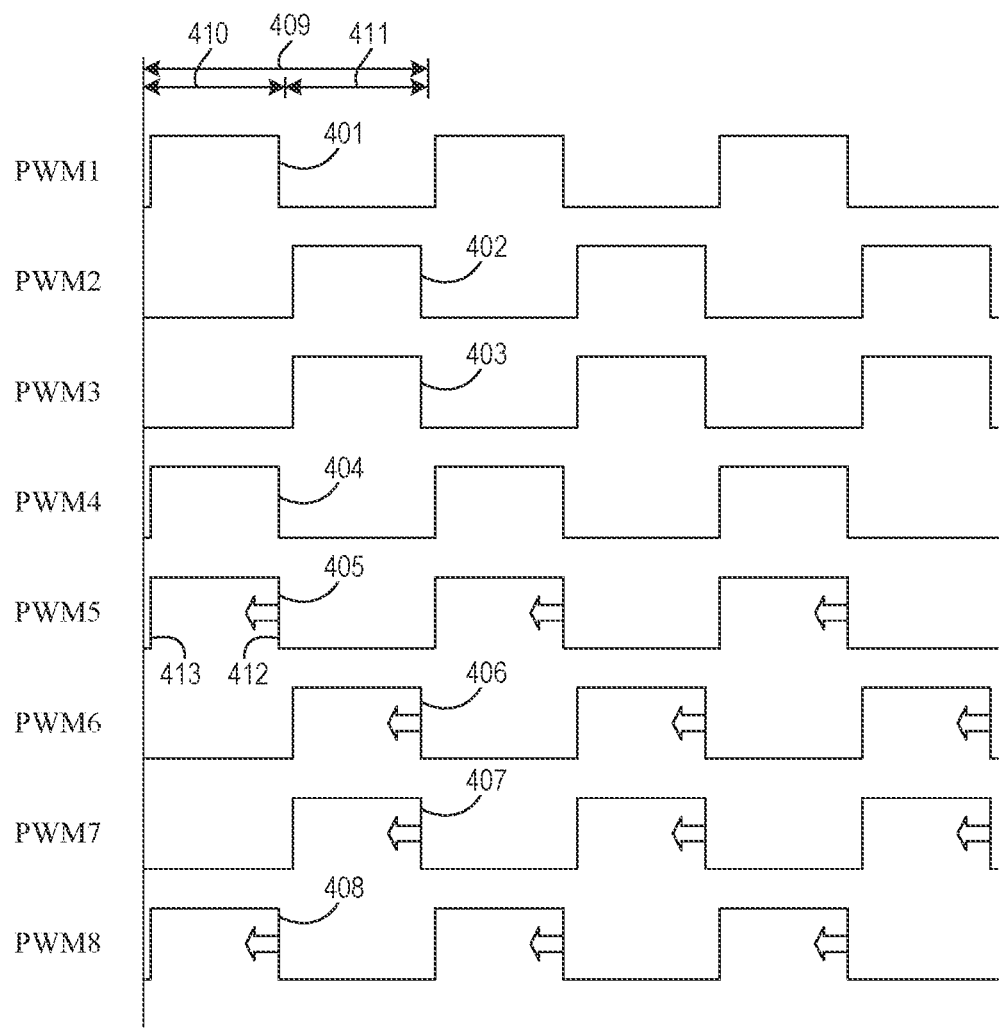
FIG. 4 illustrates control signal waveforms usable during a switching frequency adjustment control portion of the voltage converter procedure of FIG. 3 according to an example.

Referring to FIG. 4, exemplary PWM control signal waveforms PWM1-PWM8 usable during the switching frequency adjustment control portion 301 are illustrated in an example. Each PWM control signal waveform PWM1-PWM8 includes a plurality of pulses 401-408 calculated to control the respective secondary side switches 214-217 to produce the desired output voltage. The pulses 401-408 control the secondary side switches 214-217 into their conducting states or modes and occur once in each switching cycle 409. For example, pulses 401, 404, 405, and 408 occur in a first portion or segment 410 of the switching cycle 409, and pulses 402, 403, 406, and 407 occur in a second portion or segment 411 of the switching cycle 409.

As explained above, the switching frequency of the pulse-width modulated control signals PWM1-PWM8 is adjusted to achieve the desired output voltage. The length of the switching cycle 409 thus increases or decreases according to the adjusted switching frequency. As also explained above, the falling edges 412 of the PWM signals may be adjusted closer to their respective rising edges 413 as the adjusted switching frequency approaches the minimum frequency threshold. As the falling edge 412 are adjusted closer to the rising edges 413, the length of time of overlap of the pulses 405-408 of the pulses 401-404 is reduced.

As shown in FIG. 4, the primary side switches 203, 206 (Q1, Q4) and the secondary side switches 214, 217 (Q5, Q8) are controlled into their conducting states for a first period of time overlapping the first portion 410 of the switching cycle 409 and into their non-conducting states during the second portion 411 of the switching cycle 409. The primary side switches 205, 204 (Q3, Q2) and the secondary side switches 216, 215 (Q7, Q6) are controlled into their non-conducting states during the first portion 410 of the switching cycle 409 and into their conducting states for a first period of time overlapping the second portion 411 of the switching cycle 409. In an embodiment, the first and second periods of time are less than the times of the first and second portions 410, 411. Operation of the primary side switches 203-206 in this alternating manner produces a sinusoidal current that is transmitted from the primary side 201 to the secondary side 202 via the primary and secondary windings 210, 218 of the transformer 211. The alternating current is rectified by appropriate operation of the secondary side switches 214-217 as described to produce the output voltage, $V_{out}$.

Referring back to FIGS. 2 and 3, in response to the minimum frequency threshold being reached (step 311) by the adjusted switching frequency, the hold-up time extension control portion 302 of the control operation 300 is performed. At step 312, the switching frequency is set to a minimum frequency operable by the LLC converter 200 according to design parameters. The minimum switching frequency represents the lowest switching frequency designed to produce the desired output voltage during the hold-up time extension control portion 302. Using the example above where the nominal input voltage, $V_{in}$, provided via the bulk capacitor 109 is 400 V at or near a switching frequency of 350 kHz, an exemplary minimum switching frequency may be at or near 200 kHz for values of the input voltage below approximately 300 V.

Figure 5:
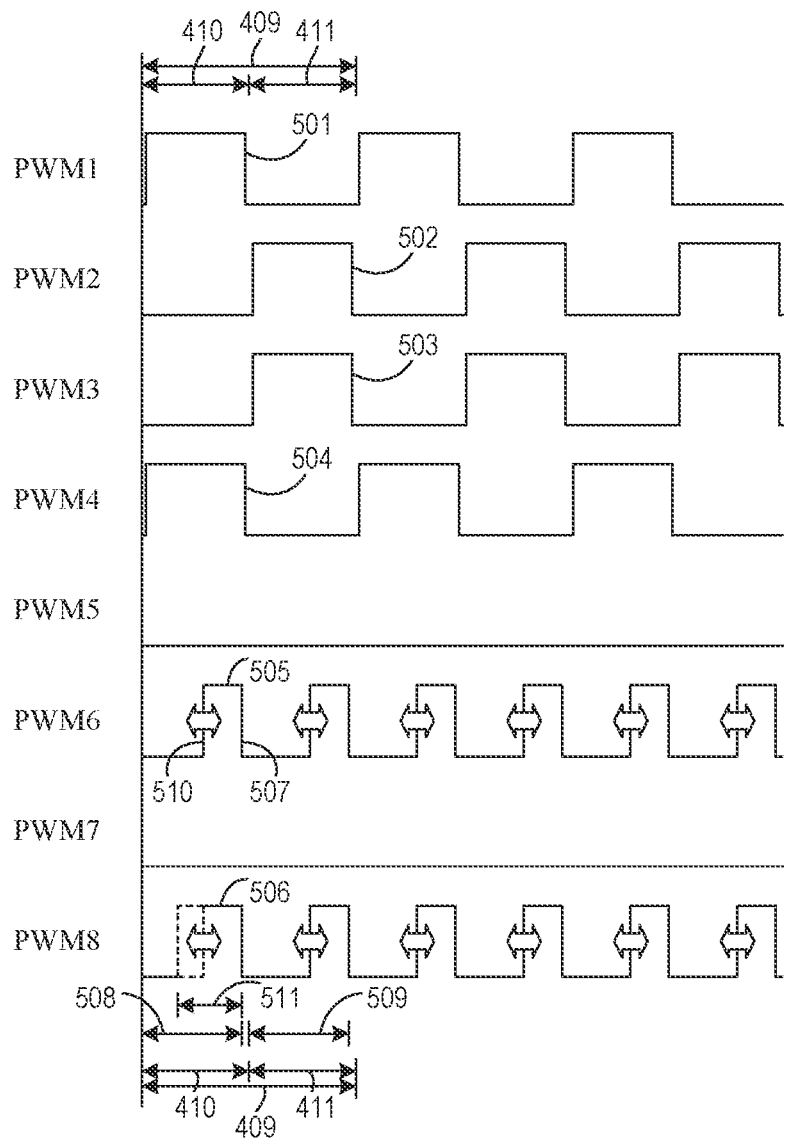
FIG. 5 illustrates control signal waveforms usable during a hold-up time extension control portion of the voltage converter procedure of FIG. 3 according to an example.

The output voltage is sensed at step 313, and the pulse widths (e.g., the length of time) of the pulses of the control signals PWM6, PWM8 that control the conducting states of the secondary low-side switches 215, 217 (Q6, Q8) are adjusted at step 314. Referring as well to FIG. 5, exemplary PWM control signal waveforms PWM1-PWM8 usable during the hold-up time extension control portion 302 are illustrated in an example. As shown, pulses 501-504 of the control signals PWM1-PWM4 follow a similar pattern as pulses 401-404 of FIG. 4, though pulses 501-504 correspond to the minimum frequency set as described above.

During the hold-up time extension control portion 302, control signals PWM5 and PWM7 remain low such that no PWM pulse operates to control either of the secondary high-side switches 214, 216 (Q5, Q7) into the conducting state. However, during both the first segment 410 and the second segment 411 of the switching cycle 409, pulses 505, 506 of the control signals PWM6, PWM8 control the secondary low-side switches 215, 217 (Q6, Q8) into the conducting state for a portion of the first and second segments 410, 411. Pulses 505, 506 thus overlap a portion of each of the first and second segments 410, 411 and, in one example, overlap less than all of either of the first or second segments 410, 411 and less than all of the time of the pulses 501-504.

The pulse widths of the pulses 505, 506 adjusted at step 314 of the control operation 300 are based on a set position of a falling edge 507 of the pulses 505, 506. The falling edge 507 is set based on a synchronous rectifier shift delay 508 from the beginning of the first segment 410 of the switching cycle 409 and based on a synchronous rectifier shift delay 509 from the beginning of the second segment 411 of the switching cycle 409. In an embodiment, the synchronous rectifier shift delays 508, 509 are identical. Adjusting the pulse widths of the pulses 505, 506 includes calculating a pulse width to be used and subtracting the calculated pulse width from the falling edge 507 to determine a rising edge 510 of the pulses 505, 506. Adjustment of the pulse widths of the pulses 505, 506 at step 314 includes increasing the pulse widths as the input voltage, $V_{in}$, decreases.

At step 315, the control operation 300 compares the adjusted pulse widths with a maximum pulse width determined to produce the desired output voltage during the hold-up time extension control portion 302. As illustrated in FIG. 5, a maximum pulse width 511 is based on circuit design parameters such as a minimum threshold of the bulk voltage to be used to produce the desired output voltage. While the maximum pulse width is not reached (step 316), process control returns to step 313 for a subsequent iteration of steps 313-315. In response to the maximum pulse width having been reached (step 317), the control operation 300 ends (step 318).

Figure 6:
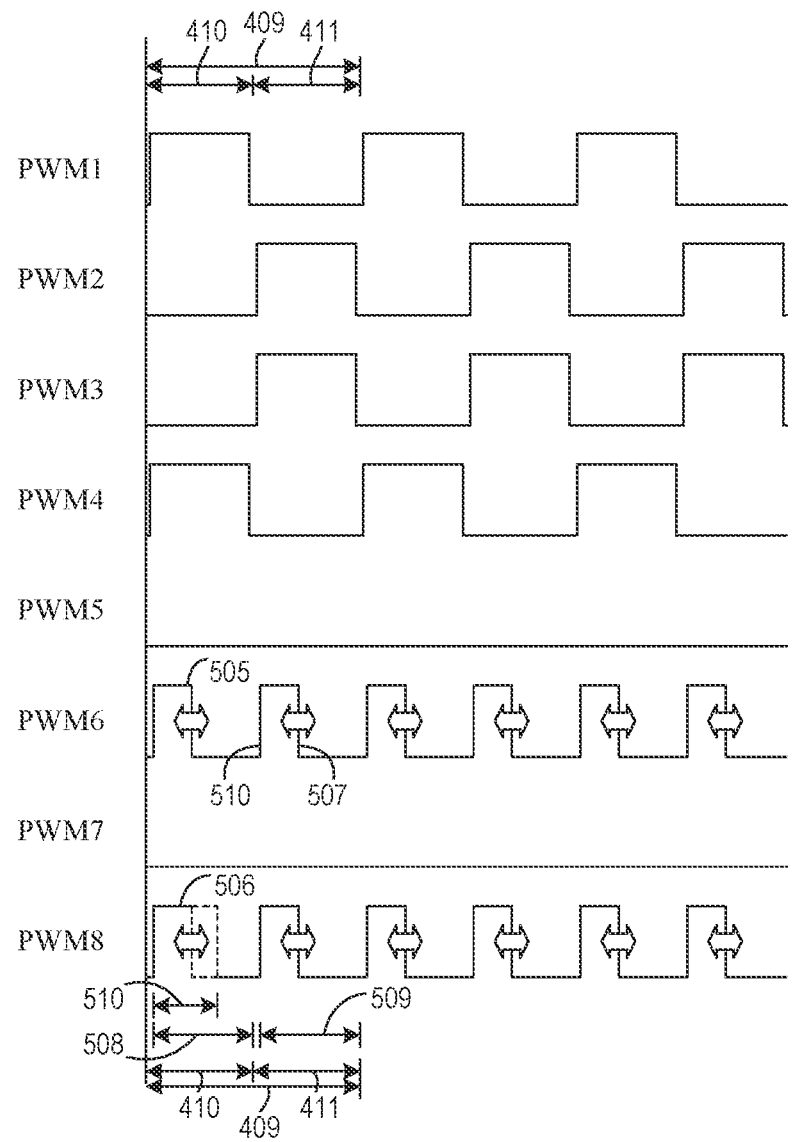
FIG. 6 illustrates control signal waveforms usable during a hold-up time mode according to another example.

FIG. 6 illustrates exemplary PWM control signal waveforms PWM1-PWM8 usable during the hold-up time extension control portion 302 in another example. The control signals PWM1-PWM5 and PWM7 are similar to those described with respect to FIG. 5. A difference between the control signals PWM6 and PWM8 of FIG. 6 with respect to the control signals PWM6 and PWM8 of FIG. 5 includes falling edge control of the pulses 505, 506 instead of the rising edge control as described in FIG. 5. The adjustment of the pulse widths of the pulses 505, 506 of FIG. 6, however, can be understood from the description of FIG. 5.

Figure 7:
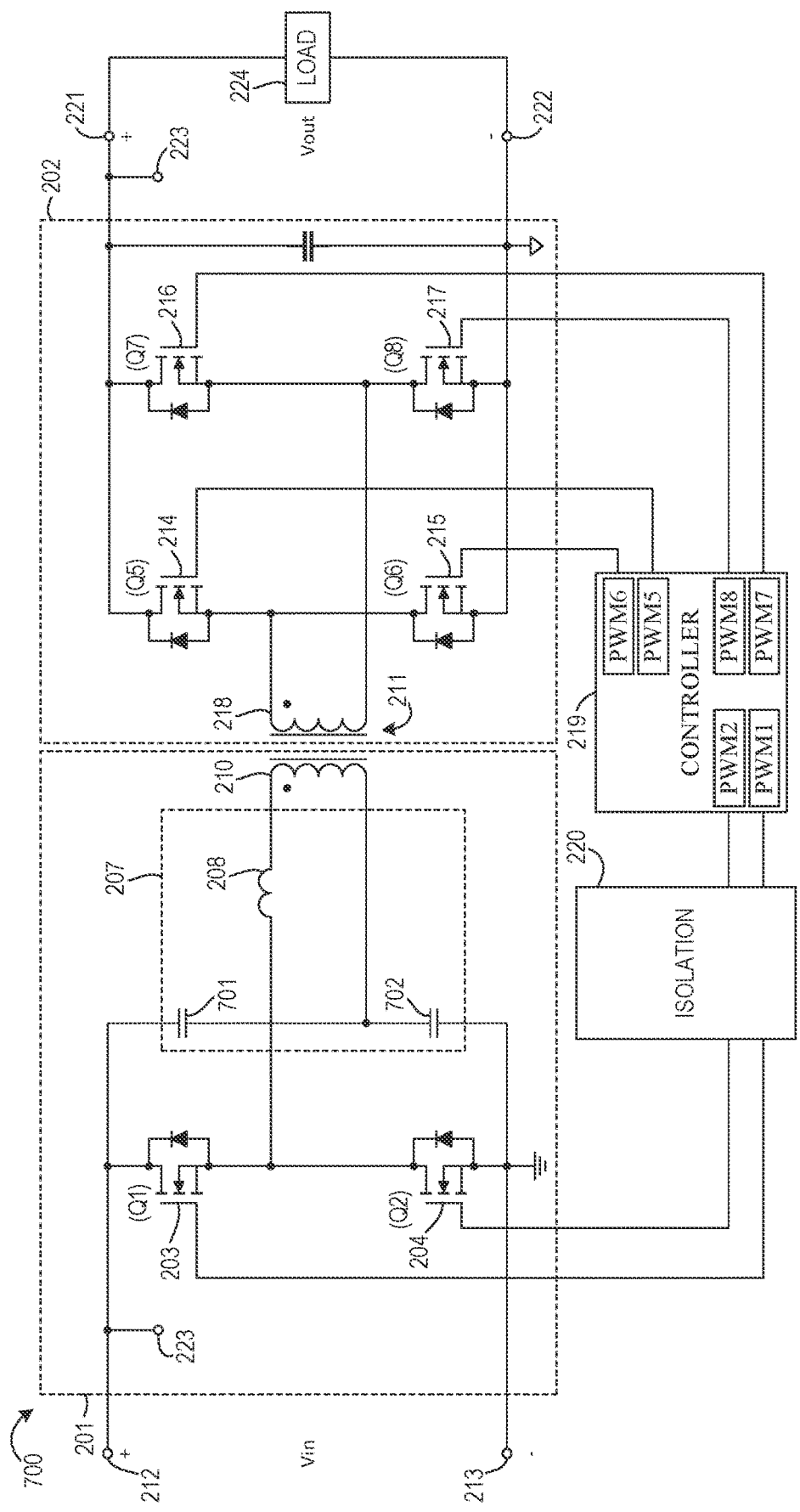
FIG. 7 illustrates a resonant half-bridge LLC converter according to an example.

FIG. 7 illustrates a resonant half-bridge LLC converter 700 for the LLC converter 110 of FIG. 1 according to an example. The primary side 201 includes switches 203, 204 coupled to the resonant network 207 including two capacitors 701,702 and the resonant inductor 208. The controller 219 implements the control signals PWM1 and PWM2 for the primary side switches 203, 204, but in contrast with the LLC converter 200 of FIG. 2, the control signals PWM3 and PWM4 are not used. Operation of the LLC converter 700, however, may proceed as described above with the elimination of the control signals PWM3 and PWM4.

Embodiments of the disclosure described herein allow for the output voltage to be generated for a time after loss of an input voltage such as the AC input voltage 103. Upon such a loss, operation of the PFC converter 108 to supply the input voltage to the LLC converter 110 is halted. However, due to the bulk energy stored in the bulk capacitor 109 prior to an input voltage loss, embodiments of this disclosure continue to provide an output voltage for a period of time (e.g., the hold-up time). The LLC converters 110, 200, 700 may thus employ control schemes based on this disclosure to extend delivery of the desired voltage output while the bulk energy provided by the bulk capacitor 109 remains above a minimum value.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the invention is not to be seen as limited by the foregoing description but is only limited by the scope of the appended claims.

The invention claimed is:

1. A power converter comprising:
   a first voltage input comprising a first input terminal and a second input terminal configured to receive an input voltage;
   a first switching element and a second switching element coupled in series across the first voltage input, each of the first and second switching elements having a conducting state and a non-conducting state;
   a transformer comprising a first winding coupled with the first and second switching elements;
   an output circuit comprising:
      a voltage output;
      a second winding of the transformer inductively coupleable to the first winding; and
      a synchronous rectifier assembly coupled between the voltage output and the second winding and comprising a plurality of switching devices coupled together in a full-bridge arrangement and configured to supply an output voltage to the voltage output in response to a current flowing through the second winding; and
   a controller coupled to the switch assembly and configured to perform a hold-up time procedure, the hold-up time procedure configured to cause the controller to:
      control the first switching element into the conducting state while controlling the second switching element into the non-conducting state during a first period of time of each pulse cycle of a plurality of pulse cycles;
      control the second switching element into the conducting state while controlling the first switching element into the non-conducting state during a second period of time of each pulse cycle of the plurality of pulse cycles;
      control a first pair of synchronous rectifier switching devices of the synchronous rectifier assembly into a conducting state during a third period of time overlapping less than all of the first period of time and into the conducting state during a fourth period of time overlapping less than all of the second period of time; and
      control a second pair of synchronous rectifier switching devices of the synchronous rectifier assembly into a non-conducting state during the first and second periods of time.

2. The power converter of claim 1, wherein the controller is further configured to vary a length of time of the third and fourth periods of time based on a voltage level of the input voltage.

3. The power converter of claim 2, wherein the controller is further configured to increase the length of time of the third and fourth periods of time in response to a decrease in the voltage level of the input voltage.

4. The power converter of claim 2, wherein the controller is further configured to:

control the first pair of synchronous rectifier switching devices into the conducting state via a pulse-width modulation (PWM) signal; and adjust a position of a rising edge of each pulse of the PWM signal within the first and second periods of time to vary the length of time of the third and fourth periods of time.

5. The power converter of claim 1, wherein the controller is further configured to:

vary a switching frequency of the first and second switching elements to generate a desired output voltage based on a voltage level of the input voltage; and perform the hold-up time procedure in response to the switching frequency reaching a minimum threshold value.

6. The power converter of claim 1 further comprising a resonant circuit comprising:

a first inductor coupled to the first winding and to the first and second switching elements; and one or more resonant capacitors coupled to the first winding and to the first and second switching elements.

7. The power converter of claim 1, wherein the plurality of switching devices comprises four switching devices coupled in a full-bridge arrangement.

8. The power converter of claim 1, wherein the first and second switching elements are coupled in a half-bridge arrangement.

9. The power converter of claim 1 further comprising:

a third switching element; and a fourth switching element;

wherein the first, second, third, and fourth switching elements are coupled in a full-bridge arrangement.

10. The power converter of claim 9, wherein the controller is further configured to:

control the first and fourth switching elements into the conducting state while controlling the second and third switching elements into the non-conducting state during the first period of time; and control the second and third switching elements into the conducting state while controlling the first and fourth switching elements into the non-conducting state during the second period of time.

11. The power converter of claim 1 further comprising:

an AC-DC converter comprising a second voltage input and coupled to the first voltage input and configured to convert an AC source voltage into the input voltage; and a bulk capacitor coupled between the first voltage input and the AC-DC converter.

12. The power converter of claim 1, wherein:

the first switching element comprises a high-side switching element;

the second switching element comprises a low-side switching element;

the switching devices of the first pair of synchronous rectifier switching devices comprise high-side switching elements; and the switching devices of the second pair of synchronous rectifier switching devices comprise low-side switching elements.

13. A method for controlling a secondary side synchronous rectifier assembly of a power converter during a hold-up time, the power converter further comprising a voltage input, a plurality of primary side switching elements coupled to the voltage input, a resonant circuit coupled to the plurality of primary side switching elements, and an output circuit having a voltage output, wherein the resonant circuit has a first transformer winding, wherein the output circuit has a second transformer winding coupled to the secondary side synchronous rectifier assembly and to the voltage output, and wherein the method comprises:

controlling a first switching element of the plurality of primary side switching elements into a conducting state while controlling a second switching element of the plurality of primary side switching elements into a non-conducting state throughout a first segment of each pulse cycle of a plurality of pulse cycles;

controlling the second switching element into a conducting state while controlling the first switching element into a non-conducting state throughout a second segment of each pulse cycle of the plurality of pulse cycles;

controlling first and second rectifier switches of the secondary side synchronous rectifier assembly into conducting states overlapping a portion of the first segment of each pulse cycle and into conducting states overlapping a portion of the second segment of each pulse cycle; and controlling third and fourth rectifier switches of the secondary side synchronous rectifier assembly into non-conducting states throughout each pulse cycle.

14. The method of claim 13, wherein a length of time of the portion of the first segment of each pulse cycle is less than a length of time of the first segment of each pulse cycle; and wherein a length of time of the portion of the second segment of each pulse cycle is less than a length of time of the second segment of each pulse cycle.

15. The method of claim 14 further comprising varying the length of time of the portion of the first segment of each pulse cycle and the length of time of the portion of the second segment of each pulse cycle based on a voltage level of an input voltage supplied to the voltage input.

16. The method of claim 15, wherein varying the lengths of time of the portions of the first and second segments of each pulse cycle comprises:

adjusting, based on a voltage level of the input voltage, a timing of a rising edge of a pulse controlling the conducting states of the first and second rectifier switches in relation to a rising edge of a pulse controlling the conducting state of the first switching element; and setting a timing of a falling edge of the pulse controlling the conducting states of the first and second rectifier switches to a fixed time in relation to the rising edge of the pulse controlling the conducting state of the first switching element.

17. The method of claim 15, wherein varying the lengths of time of the portions of the first and second segments of each pulse cycle comprises:

adjusting, based on a voltage level of the input voltage, a timing of a falling edge of a pulse controlling the conducting states of the first and second rectifier switches in relation to a rising edge of a pulse controlling the conducting state of the first switching element; and setting a timing of a rising edge of the pulse controlling the conducting states of the first and second rectifier switches to a fixed time in relation to the rising edge of the pulse controlling the conducting state of the first switching element.

18. The method of claim 13, wherein the secondary side synchronous rectifier assembly further comprises third and fourth rectifier switches; and wherein the first, second, third, and fourth switches of the secondary side synchronous rectifier assembly are coupled together in a full-bridge arrangement.

19. The method of claim 18, wherein the first and second switching elements are coupled together in a half-bridge arrangement.

20. The method of claim 18, wherein the plurality of primary side switching elements further comprises third and fourth switching elements; and wherein the first, second, third, and fourth switches of the plurality of primary side switching elements are coupled together in a full-bridge arrangement.

* * * * *